United States Patent [19]
> Imai et al.

[11] Patent Number: 4,929,347
[45] Date of Patent: May 29, 1990

[54] CONCENTRATING APPARATUS WITH REVERSE OSMOSIS MEMBRANE

[75] Inventors: Masaaki Imai, Nishinomiya; Minoru Uemura, Itami, both of Japan

[73] Assignee: Sasakura Engineering Co., Ltd., Osaka, Japan

[21] Appl. No.: 377,882

[22] Filed: Jul. 10, 1989

[30] Foreign Application Priority Data

Jul. 11, 1988 [JP] Japan .................. 63-173172

[51] Int. Cl.$^5$ .................. B01D 13/00; B01D 31/00
[52] U.S. Cl. .................. 210/101; 210/134; 210/321.65
[58] Field of Search ............... 210/634, 637, 644, 649, 210/97, 101, 130, 134, 136, 137, 321.65, 195.2, 257.2, 416.1, 433.1, 434

[56] References Cited

U.S. PATENT DOCUMENTS 4,432,876  2/1984  Keefer .................. 210/652

FOREIGN PATENT DOCUMENTS 62-311227  12/1987  Japan .
63-264105  11/1988  Japan .

*Primary Examiner*—Frank Sever
*Attorney, Agent, or Firm*—Marshall, O'Toole, Gerstein, Murray & Bicknell

[57] ABSTRACT

This disclosure relates to a reverse osmosis apparatus comprising a reciprocating pump or pumps including a first cylinder chamber and a second cylinder chamber which is smaller in volume than the first chamber due to a piston rod extending through the second cylinder chamber, a feed conduit connected to the first cylinder chamber for feeding fluid thereto through a first one-way flow piping for fluid flow thereto, a reverse osmosis membrane module including an inlet and an outlet which collects permeate fluid, a second one-way flow piping connecting the first cylinder chamber with the reverse osmosis membrane module inlet for fluid flow to the inlet, a selector connecting the second cylinder chamber with the reverse osmosis membrane module outlet, and a drain conduit connected to the selector for draining concentrated fluid from the second cylinder chamber. The selector has a first position allowing the reverse osmosis membrane module outlet and the second cylinder chamber to communicate together and isolating the drain conduit. The selector also has a second position blocking the outlet allowing the second cylinder chamber and the drain conduit to communicate together. The selector is connected in pressure communication with the cylinder chambers to shift to the first position when the pressure in the first cylinder chamber increases, and to the second position when the pressure in the second cylinder chamber increases.

1 Claim, 4 Drawing Sheets

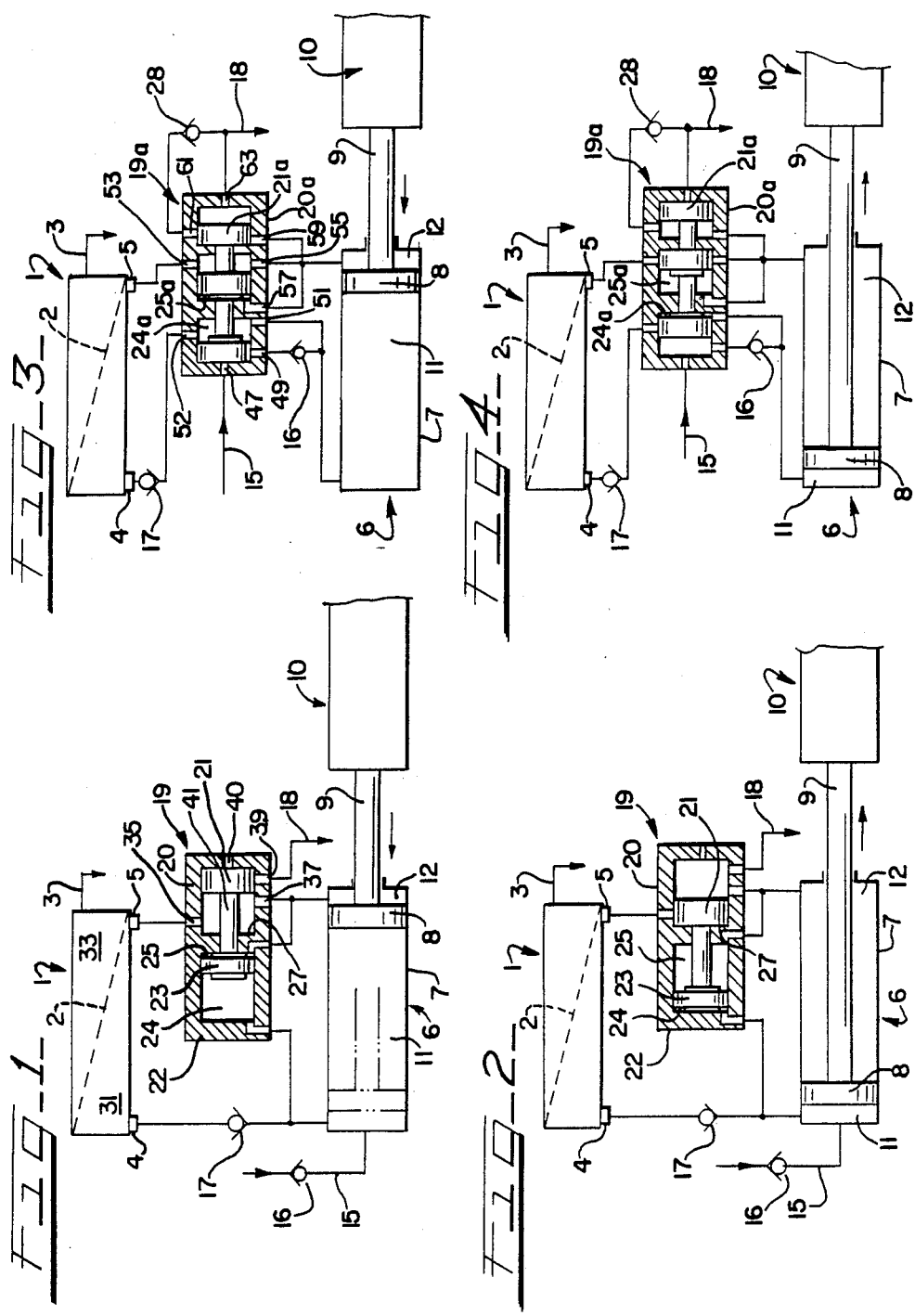

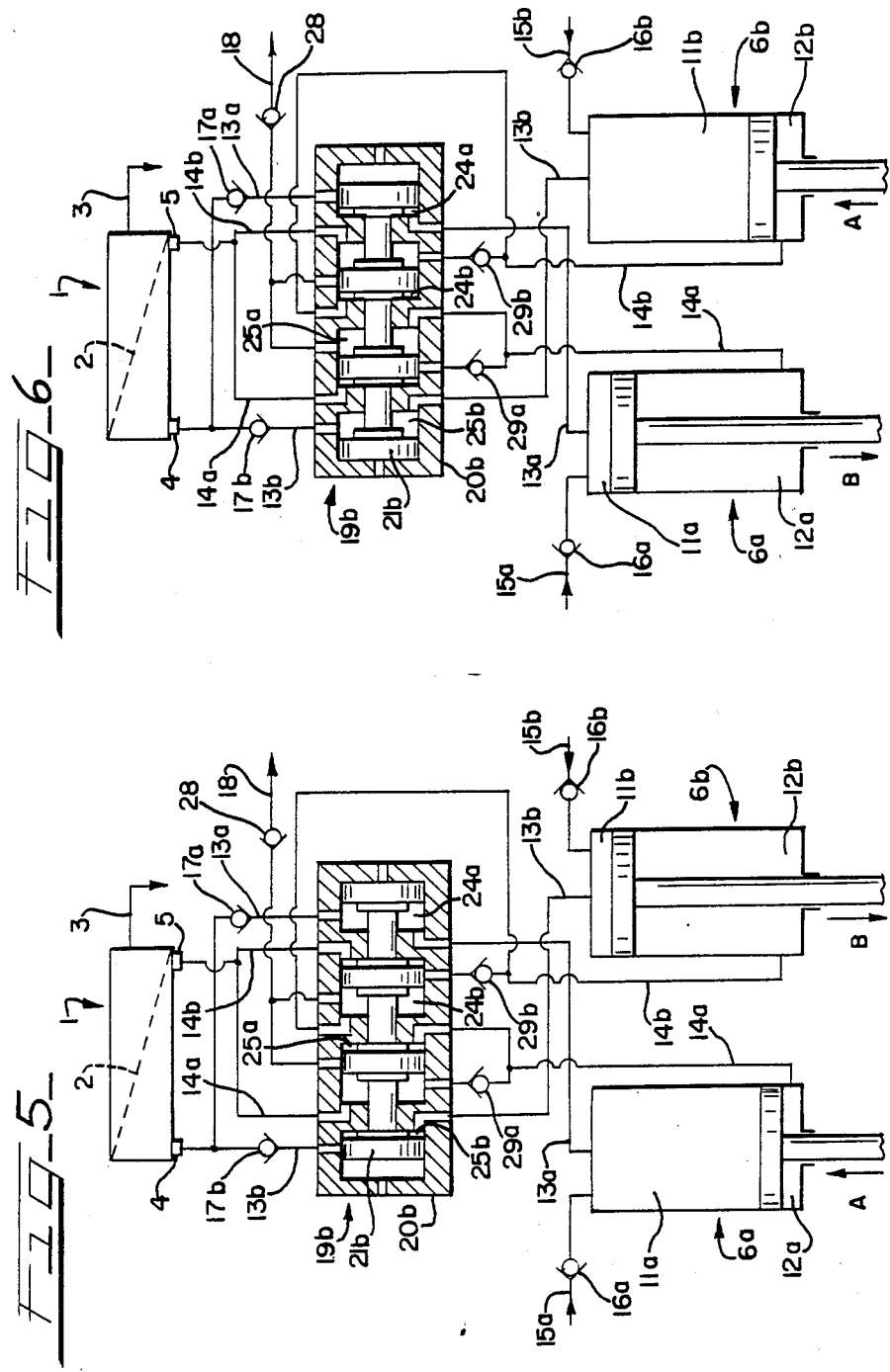

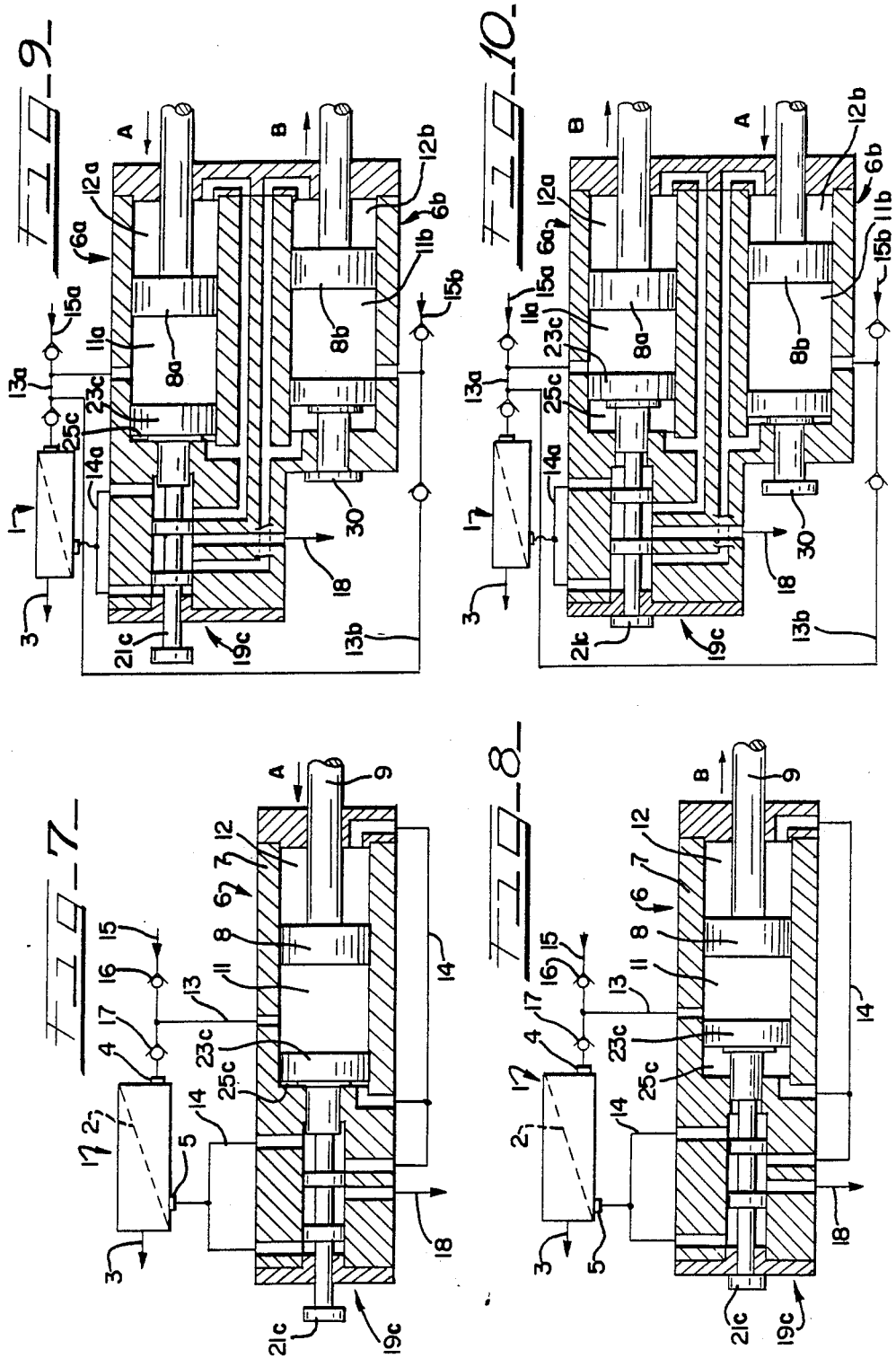

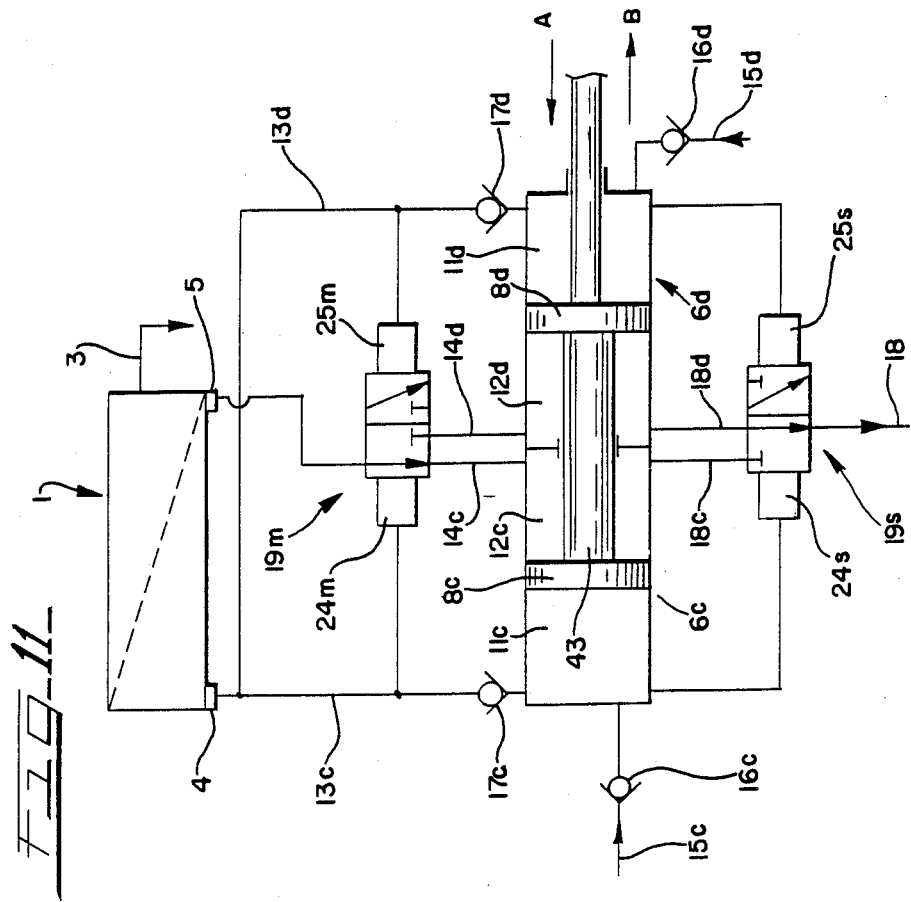

CONCENTRATING APPARATUS WITH REVERSE OSMOSIS MEMBRANE

FIELD AND BACKGROUND OF THE INVENTION

The present invention relates to desalting/concentrating apparatus by means of a reverse osmosis membrane. The apparatus pressurizes feed fluid under high pressure and supplies it to the membrane, and separates the fluid into a permeate fraction which permeates through the membrane and a concentrate fraction which does not permeate it.

U.S. Pat. No. 4,432,876 to Keefer shows a prior art reverse osmosis apparatus. With particular reference to FIG. 2 of the patent, a reciprocating feed pump 60 includes a pumping chamber 26.2 and an expansion chamber 37.2 which contains a portion of a piston rod 63 and is therefore smaller in cross-sectional area than the pumping chamber 26.2. The pumping chamber 26.2 connects through check valves 32.2 and 33.2 respectively with a feed fluid conduit 28.2 and a membrane pressure vessel 17 (FIG. 1 of the patent). The expansion chamber 37.2 connects through directional valves 42.2 and 44.2 respectively with the membrane pressure vessel and an exhaust conduit.

A pumping stroke forces the feed fluid out of the pumping chamber 26.2, through the membrane pressure vessel and into the expansion chamber 37.2 under high pressure because of the difference in volume between these chambers, thereby separating a permeate fluid fraction 13.2. An intake or induction stroke sucks a feed fluid into the pumping chamber 26.2, and exhausts a concentrate fluid fraction 14.2.

The directional valves 42.2 and 44.2 are timed in association with the reciprocating feed pump 60 or the reciprocable drive 48 (FIG. 1), via an electric control circuit or an interlocking mechanism, to open after initiation of a pumping or exhaust stroke respectively so that the valve actuation lags behind the piston stroke.

Upon initiation of a pumping or induction stroke, there is a sudden pressure rise respectively in the pumping or expansion chamber as the appropriate directional valve has not yet opened. This pressure rise is reduced by a volume exchange means 64 provided between the outfeed and return conduits 30.2 and 38.2.

The provision of the electrical control circuit or the interlocking mechanism and the volume exchanger 64 increases the cost, size and weight of the apparatus. In addition, the exchanger 64 interrupts the pump operation for an instant at each end of the pump stroke, thus reducing the concentration capacity.

It is an object of the present invention to provide a reverse osmosis apparatus without the above problems.

SUMMARY OF THE INVENTION

Apparatus according to this invention comprises a reciprocating pump including a first cylinder chamber and a second cylinder chamber which has a smaller volume than the first chamber, with a piston rod extending through the second chamber, a feed conduit means connected to the first chamber for feeding fluid thereto through a first one-way flow means for fluid flow thereto, a reverse osmosis membrane module including an inlet and outlet, a second one-way flow means connecting the first chamber with the reverse osmosis membrane module inlet for fluid flow to the inlet, a selector connecting said second chamber with the reverse osmosis membrane module outlet and a drain conduit means connected to the selector for draining concentrated fluid from the second chamber.

The selector has a first position where the outlet and the second chamber communicate together and where the drain conduit means is isolated, and a second position where the outlet is blocked and the second chamber and the drain conduit means communicate together.

The selector is connected in association with the cylinder chambers to shift to the first position when the pressure in the first chamber increases, and to the second position when the pressure in the second chamber increases.

When the second pump cylinder chamber has contracted in volume, assuming that the selector is in its second position which substantially prevents fluid flow from the first chamber through the reverse osmosis module, force applied to the pump piston to contract the first chamber cannot substantially start the piston moving. This force does, however, develop pressure in the first chamber, which then shifts the selector to its first position, permitting fluid flow from the module to the second chamber and starting the piston.

When the first pump cylinder chamber has contracted in volume, the selector remains in the first position, substantially preventing fluid flow from the second chamber through the module and the drain conduit means. Force applied to the piston to contract the second chamber cannot substantially start the piston moving. This force does, however, develop pressure in the second chamber, which then shifts the selector to the second position, permitting fluid flow from the second chamber to the drain means and starting the piston.

Thus, the piston movement starts each time after the selector shifts to either the first or second position, so that the selector can be accurately timed to shift at each end of the pump reciprocation. Consequently, during the shifting of the selector, fluid in the reverse osmosis module is prevented from being compressed by the pump as the fluid is trapped in the module.

BRIEF EXPLANATION OF THE DRAWINGS

Preferred embodiments of this invention are described below with reference to the accompanying drawings, wherein:

FIGS. 1 and 2 are diagrams showing the first embodiment in different stages of operation;

FIGS. 3 and 4 are diagrams showing the second embodiment in different stages of operation;

FIGS. 5 and 6 are diagrams showing the third embodiment in different stages of operation;

FIGS. 7 and 8 are diagrams showing the fourth embodiment in different stages of operation;

FIGS. 9 and 10 are diagrams showing the fifth embodiment in different stages of operation;

FIG. 11 is a diagram showing the sixth embodiment.

DETAILED DESCRIPTION OF THE INVENTION

In FIGS. 1–2, a tank 1 contains a reverse osmosis membrane 2 separating the tank into two chambers 31 and 33. The first chamber 31 is provided with a feed fluid inlet 4 at one end and a concentrate fluid outlet 5 at the other end. The second chamber 33 is provided with a permeate fluid outlet pipe 3.

A reciprocating pump 6 includes a cylinder 7 and a piston 8 which is fixed to a rod 9 extending out of the cylinder 7. The rod 9 is coupled to a reciprocal drive 10, such as a hydraulic cylinder system.

The piston 8 defines two cylinder chambers 11 and 12 on opposite sides of the piston. The first chamber 11 has a larger volume than the second chamber 12 which contains a portion of piston rod 9. Thus, the maximum volume of the first chamber 11 is larger than that of the second chamber 12.

The first pump chamber 11 is connected with a feed pipe 15 that is provided with a check valve 16 for fluid flow to this chamber 11. The first chamber 11 is piped with the tank inlet 4 through a check valve 17 for fluid flow to the tank 1.

The second pump chamber 12 is piped to the tank outlet 5 through a spool-type directional control valve or selector 19. This thus constitutes a circulating pipeline in a closed loop including the tank 1 and pump 6.

The selector 19 includes a valve casing 20 and a pilot cylinder 22 which is integral to, but partitioned from the casing 20 by a wall 27.

The valve casing 20 contains a spool 21 for reciprocation therewithin, and is formed with an inlet 35, a port 37 and an outlet 39, which connect with the tank outlet 5, the second pump chamber 12 and a drain pipe 18, respectively, and a breath hole 40 opening into the atmosphere.

The pilot cylinder 22 contains a piston 23 defining two cylinder chambers 24 and 25 on opposite sides of the piston, which are piped to pump chambers 11 and 12, respectively. The piston 23 is coupled to the spool 21 by a rod 41.

When pressure is applied from the first pump chamber 11 to the first pilot chamber 24, the selector spool 21 is shifted to its first position shown in FIG. 1, wherein its inlet 35 and port 37 communicate together and its outlet 39 and hole 40 are blocked.

When pressure is applied from the second pump chamber 12 to the second pilot chamber 25, the selector 19 is shifted to its second position shown in FIG. 2, wherein its inlet 35 is blocked and its port 37, outlet 39 and hole 40 communicate together.

In operation, when the pump piston 8 has its first position shown in FIG. 1, assuming that the selector 19 initially has the second position (FIG. 2), which blocks the fluid flow out of the first pump chamber 11 through the tank 1 into the second tank chamber 12, the force applied to the piston 8 by the drive 10 to the left initially cannot substantially move the piston 8.

The reverse osmosis membrane 2 is highly resistant to the flow of fluid, so that little fluid permeates through the membrane into the second tank chamber 33 at this stage.

This force on the pump piston 8 develops a pressure in the first pump chamber 11, and this pressure is transmitted to the first pilot chamber 24, shifting the selector 19 to its first position (FIG. 1). This allows the fluid to flow from the first pump chamber 11 through the tank 1 to the second pump chamber 12, and consequently starts the pump piston 8 substantially moving to the left.

During this flow, the fluid in the first tank chamber 31 is highly compressed because of the difference in maximum volumes between the pump chambers 11 and 12 (due to the rod 9), so that a permeate fluid fraction permeates through the reverse osmosis membrane 2 into the second chamber 33 and is removed through the pipe 3 in an amount corresponding substantially to the difference in pump chamber volumes.

When the pump piston 8 has reached the second position (FIG. 2), the selector 19 remains in its first position (FIG. 1). The check valve 17 prevents the fluid from flowing back from the second pump chamber 12 through the tank 1 and into the first pump chamber 11, so that the force applied to the pump piston 8 from the drive 10 to the right initially cannot substantially move this piston 8.

Likewise, this force develops a pressure in the second pump chamber 12, and this pressure is supplied to the second pilot chamber 25 and to the chamber on the left side of the spool 21. The initial movement of the piston 23 to the right also creates a suction or below atmospheric pressure in the chamber 24. These pressures shift the selector 19 to its second position (FIG. 2). This allows the second pump chamber 12 to communicate with the drain pipe 18, and consequently starts the pump piston 8 moving substantially to the right.

During this pump piston 8 movement to the right, feed fluid is sucked through the feed pipe 15 into the first pump chamber 11, while the concentrate fluid in the second pump chamber 12 is drained through the drain pipe 18, and partially through the breath hole 40.

FIGS. 3-4 show the second embodiment, wherein a selector 19a has a spool 21a and three partitioned interior sections. In FIGS. 3 to 11, the reference numerals used in FIGS. 1 and 2 are again used to designate similar or corresponding parts.

The left section of the selector has a first inlet 47 connected with a feed pipe 15, a first outlet 49 piped to the first cylinder chamber 11 of a reciprocating pump 5 via a check valve 16 for fluid flow to the chamber 11, a second inlet 51 also piped to chamber 11, and a second outlet 52 piped to inlet 4 of a reverse osmosis tank 1 via a check valve 17 for fluid flow to the inlet 4. This section includes a first pilot cylinder chamber 24a on the right side, which always communicates via the second inlet 51 with the first pump chamber 11.

The center section of the selector has an inlet 53 piped to outlet 5 of tank 1, and an outlet 55 and a port 57 both piped to the second chamber 12 of pump 6. This section includes a second pilot cylinder chamber 25a on the left side, which always communicates via the port 57 with the second pump chamber 12.

The right section of the selector has an inlet 59 piped to the second pump chamber 12, an outlet 61 connected with a drain pipe 18 via a check valve 28 for fluid flow to the drain pipe 18, and a breath hole 63 also connected with the drain pipe 18.

In operation, it is assumed that the pump piston 8 has its first position shown in FIG. 3, but the selector 19a initially has its second position (FIG. 4). When force is applied to move the pump piston 8 to the left, an increasing pressure in the first pump chamber 11 transfers to the first pilot chamber 24a, while an increasing negative pressure in the second chamber 12 acts on the left side of spool 21a, thereby shifting the selector 19a to its first position shown in FIG. 3.

This allows the pump piston 8 to move to the left, and forces liquid to flow from the first pump chamber 11 through the tank 1 to the second pump chamber 12, with a permeate liquid fraction being obtained.

When the pump piston 8 has reached the second position (FIG. 4), and force is applied to move it to the right, with the selector 19a now in its first position (FIG. 3), an increasing pressure in the second pump chamber 12 transfers to the second pilot chamber 25a, while an increasing negative pressure in the first pump chamber 11 transfers to the first pilot chamber 24a, thereby shifting the selector 19a to its second position of FIG. 4.

This allows the piston 8 to move to the right, suck feed liquid into the first pump chamber 11 from the feed pipe 15, and drain a concentrate liquid fraction from the second pump chamber 12 through the drain pipe 18.

FIGS. 5-6 show the third embodiment, wherein one reverse osmosis tank 1 is used with two reciprocating pumps 6a and 6b arranged in parallel. The pistons of these pumps are reciprocated in opposite directions to each other.

The first cylinder chambers 11a and 11b of pumps 6a and 6b connect with feed pipes 15a and 15b, which are provided with check valves 16a and 16b for fluid flow to the chambers 11a and 11b, respectively.

The chambers 11a and 11b also connect to tank inlet 4 through a selector 19b and first pipes 13a and 13b, which are provided with check valves 17a and 17b, respectively, for fluid flow to the inlet 4.

The second cylinder chambers 12a and 12b of pumps 6a and 6b connect to tank outlet 5 through the selector 19b and second pipes 14a and 14b, which are provided with check valves 29a and 29b for fluid flow to the chambers 12a and 12b, respectively.

The second chambers 12a and 12b also connect through the selector 19b to a concentrated fluid drain pipe 18, which is provided with a check valve 28 for fluid flow from the selector.

The selector 19b includes a valve casing 20b, in which a spool 21b slides so that the selector takes first and second positions.

In the first position shown in FIG. 5, the system operates as follows:

The first pipe 13a for pump 6a continues, while the first pipe 13b for pump 6b is blocked. The second pipe 14a for pump 6a continues, while the second chamber 12a of pump 6a is blocked from the drain pipe 18. The second pipe 14b for pump 6b is blocked, while the second chamber 12b of pump 6b communicates with the drain pipe 18.

In the second position shown in FIG. 6, the operation is as follows:

The first pipe 13a for pump 6a is blocked, while the first pipe 13b for pump 6b continues. The second pipe 14a for pump 6a is blocked, while the second chamber 12a of pump 6a communicates with the drain pipe 18. The second pipe 14b for pump 6b continues, while the second chamber 12b of pump 6b is blocked from the drain pipe 18.

The selector 19b is formed therein with two first pilot cylinder chambers 24a and 24b for shifting the spool 21b to the first selector position, and two second pilot cylinder chambers 25a and 25b for shifting the spool 21b to the second position.

The first pilot chambers 24a and 24b connect to receive pressure from the first chamber 11a of pump 6a and the second chamber 12b of pump 6b, respectively. The second pilot chambers 25a and 25b connect to receive pressure from the second chamber 12a of pump 6a and the first chamber 11b of pump 6b, respectively.

When force is applied to the pistons of pumps 6a and 6b in the directions A and B, respectively, as shown in FIG. 5, the pressures in their first and second chambers 11a and 12b increase. The increased pressures transfer to the first pilot chambers 24a and 24b to shift the selector 19b to its first position (FIG. 5).

This starts the piston of pump 6a moving in the direction A to produce permeate liquid, and the piston of pump 6b moving in the direction B to suck feed liquid into its first chamber 12b.

When force is applied to the pistons of pumps 6a and 6b in the directions B and A, respectively, as shown in FIG. 6, the pressures in their second and first chambers 12a and 11b increase. The increased pressures transfer to the second pilot chambers 25a and 25b to shift the selector 19b to its second position (FIG. 6).

This starts the piston of pump 6a moving in the direction B to suck feed liquid into its first chamber 11a and drain the concentrate liquid from its second chamber 12a. At the same time, the piston of pump 6b is started moving in the direction A to produce permeate liquid.

FIGS. 7-8 show the fourth embodiment, wherein part of a reciprocating pump 6 forms a pilot cylinder chamber for a selector 19c. The pump 6 includes a cylinder 7 within which a pump piston 8 and a pilot piston 23c can slide. The pilot piston 23c is coupled to the selector spool 21c.

The pistons 8 and 23c define a first pump cylinder chamber 11 there between, which also functions as a first pilot cylinder chamber for shifting the selector 19c to its first position shown in FIG. 7, a second pump cylinder chamber 12 on the other side of pump piston 8, and a second pilot cylinder chamber 25c on the other side of pilot piston 23c.

The second pilot chamber 25c connects to receive pressure from the second pump chamber 12 to shift the selector 19c to its second position shown in FIG. 8.

When force is applied to the pump piston 8 in the direction A (FIG. 7), the increased pressure in the first pump/pilot chamber 11 shifts the selector 19c to its first position shown in FIG. 7. This starts the pump piston 8 moving in the direction A to produce permeate liquid.

When force is applied to the pump piston 8 in the direction B (FIG. 8), the increased pressure in the second pump chamber 12 transfers to the second pilot chamber 25c and shifts the selector 19c to its second position shown in FIG. 8. This starts the pump piston 8 moving in the direction B to suck feed liquid into the pump/pilot chamber 11 and drain the concentrate liquid from the second pump chamber 12 through the drain pipe 18.

FIGS. 9-10 show the fifth embodiment, wherein a selector 19c such as shown in FIGS. 7-8 is combined with two reciprocating pumps 6a and 6b, which are arranged in parallel for opposite reciprocation to each other as shown in FIGS. 5-6.

The pump 6a is provided with a pilot piston 23c coupled to the selector spool 21c. The pump 6b is provided with a balance piston 30 corresponding to the pilot piston 23c.

When force is applied to the pistons 8a and 8b of pumps 6a and 6b in the opposite directions A and B (FIG. 9), respectively, the increased pressure in the first chamber 11a of pump 6a shifts the selector 19c to its first position shown in FIG. 9.

This starts the pump piston 8a moving in the direction A to produce permeate liquid, and the pump piston 8b moving in the direction B to suck feed liquid into the first chamber 11b of pump 6b and drain the concentrate liquid from its second chamber 12b through the drain pipe 18.

When force is applied to the pump pistons 8a and 8b in the opposite directions B and A (FIG. 10), respectively, the increased pressure in the second chamber 12a of pump 6a transfers to the second pilot chamber 25c and shifts the selector 19c to its second position shown in FIG. 10.

This starts the pump piston 8a moving in the direction B to suck feed liquid into the first chamber 11a and drain the concentrate liquid from the second chamber 12a through the drain pipe 18. At the same time, the pump piston 8b is started moving in the direction A to produce permeate liquid.

The balance piston 30 functions to equalize the maximum and minimum volumes of first chamber 11a respectively with those of first chamber 11b.

FIG. 11 shows the sixth embodiment, wherein two reciprocating pumps 6c and 6d coupled together in series, with their respective pistons 8c and 8d coupled by a thick rod 43.

The first cylinder chambers 11c and 11d of pumps 6c and 6d connect to the inlet 4 of a reverse osmosis tank 1 through pipes 13c and 13d having check valves 17c and 17d, respectively. The first chambers 11c and 11d also connect to feed pipes 15c and 15d having check valves 16c and 16d, respectively.

The second pump chambers 12c and 12d, which are smaller in volume than the first chambers, connect to the tank outlet 5 through pipes 14c and 14d, respectively, and through a main selector 19m. The second chambers 12c and 12d also connect to a concentrate liquid drain pipe 18 through pipes 18c and 18d, respectively, and through a subselector 19s.

The main selector 19m has a first position, as shown in FIG. 11, wherein the second pipe 14c continues and the second pipe 14d is blocked, and a second position, not shown, wherein the second pipe 14c is blocked and the second pipe 14d continues.

The subselector 19s has a first position, as shown in FIG. 11, wherein the pipe 18c is blocked and the pipe 18d continues, and a second position, not shown, wherein the pipe 18c continues and the pipe 18d is blocked.

The selectors 19m and 19s have respective first pilot cylinder chambers 24m and 24s, which connect to the first chamber 11c of pump 6c (or otherwise to the second chamber 12d of pump 6d), and respective second pilot cylinder chambers 25m and 25s, which connect to the first chamber 11d of pump 6d (or otherwise to the second chamber 12c of pump 6c).

Thus, according to this invention, during the shifting of the selector, feed liquid in the reverse osmosis tank is prevented from being compressed by the pump with the liquid trapped in the tank, and it is not required to provide a volume exchanger between the outfeed and return pipes, as is required in the above U.S. Pat. No. 4,432,876. This does not lower the capacity for concentration.

In addition, the selector is shifted by pressure changes in both cylinder chambers of the pump, without necessitating mechanical or electric means for associating the selector with the reciprocation of the pump, or with a reciprocating drive for the pump, as is required in the patent. This, in combination with the elimination of a volume exchanger, thus simplifies and minimizes the apparatus and lowers the cost.

What is claimed:

1. Reverse osmosis apparatus comprising:
a reciprocating pump means including a first cylinder chamber and a second cylinder chamber, which is smaller in volume than said first chamber and has a piston rod extending through said second cylinder chamber,
feed conduit means connected to said first cylinder chamber for feeding fluid thereto through a first one-way flow means for fluid flow thereto,
a reverse osmosis membrane module including an inlet and outlet to collect permeate fluid,
a second one-way flow means connecting said first cylinder chamber with said reverse osmosis membrane module inlet for fluid flow to said inlet, and
a selector connecting said second cylinder chamber with said reverse osmosis membrane module outlet,
a drain conduit means connected to said selector for draining concentrated fluid from said second cylinder chamber,
said selector having a first position where said reverse osmosis membrane module outlet and said second cylinder chamber communicate together and said drain conduit means is isolated, and a second position where said outlet is blocked and said second cylinder chamber and said drain conduit means communicate together,
means for continuous pump operation including means for enabling said selector to be connected in pressure communication with said cylinder chambers to shift to said first position when the pressure in said first cylinder chamber increases, and to said second position when the pressure in said second cylinder chamber increases.

* * * * *